United States Patent
Sezan et al.

(10) Patent No.: US 7,929,021 B2
(45) Date of Patent: Apr. 19, 2011

(54) METHODS AND SYSTEMS FOR A/V INPUT DEVICE TO DISPLAY NETWORKING

(75) Inventors: Muhammed Ibrahim Sezan, Camas, WA (US); Bernd Girod, Stanford, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 902 days.

(21) Appl. No.: 11/534,218

(22) Filed: Sep. 22, 2006

(65) Prior Publication Data

US 2007/0013801 A1    Jan. 18, 2007

Related U.S. Application Data

(63) Continuation of application No. PCT/US2005/010065, filed on Mar. 24, 2005.

(60) Provisional application No. 60/556,207, filed on Mar. 24, 2004.

(51) Int. Cl.
H04N 5/232 (2006.01)
(52) U.S. Cl. .................. 348/211.2; 348/211.5
(58) Field of Classification Search .............. 348/211.2
See application file for complete search history.

(56) References Cited

U.S. PATENT DOCUMENTS

| | | | |
|---|---|---|---|
| 5,550,754 A | 8/1996 | McNelley et al. | |
| 5,760,824 A | 6/1998 | Hicks, III | |
| 6,201,562 B1 | 3/2001 | Lor | |
| 6,275,882 B1 | 8/2001 | Cheever et al. | |
| 6,489,986 B1 | 12/2002 | Allen | |
| 6,522,352 B1 | 2/2003 | Strandwitz et al. | |
| 6,529,233 B1 | 3/2003 | Allen | |
| 6,717,567 B1 | 4/2004 | Bowden, III et al. | |
| 7,603,113 B2 * | 10/2009 | Borcic et al. ............... | 455/414.4 |
| 7,796,162 B2 * | 9/2010 | Ortiz ........................... | 348/211.8 |
| 2003/0186708 A1 * | 10/2003 | Parulski et al. ............ | 455/456.1 |
| 2004/0109063 A1 * | 6/2004 | Kusaka et al. ............. | 348/207.1 |
| 2004/0176118 A1 * | 9/2004 | Strittmatter et al. .......... | 455/500 |
| 2004/0179106 A1 * | 9/2004 | Cazier ......................... | 348/211.4 |
| 2009/0189981 A1 * | 7/2009 | Siann et al. ................... | 348/143 |

OTHER PUBLICATIONS

P. Van Beek et al, "Adaptive Streaming of high-quality video over wireless LAN" in Proceedings of SPIE Electronic Imaging, VCIP 2004 Conference, Jan. 2004, Camas, Washington.
A. Aaron, E. Setton, and B. Girod, "Towards Practical Wyner-Ziv Coding of Video" Proc. IEEE International Conference on Image Processing. ICIP-2003, Barcelona, Spain, Sep. 2003.
D-Link Securicam Network 802.11g wireless Internet Camera, DCS-322OG, DCS5300G, D-Link Systems, Inc. Fountain Valley, California. www.dlink.com, 2004.
Leaf Valeo 22Wi & Leaf Valeo 17Wi Wireless Digital Display, Creo Americas, Inc., Billerica, MA, www.creo.com/leaf, Jan. 7, 2005.
MRC Reporter Wireless Camera Back Digital Transmitter, DTC Communications, Nashua, NH, www.dtccom.com, Apr. 2003.

* cited by examiner

Primary Examiner — Ngoc-Yen T Vu
(74) Attorney, Agent, or Firm — Krieger Intellectual Property, Inc.; Scott C. Krieger

(57) ABSTRACT

Embodiments of the present invention comprise methods and systems for input device to television networking.

8 Claims, 10 Drawing Sheets

METHODS AND SYSTEMS FOR A/V INPUT DEVICE TO DISPLAY NETWORKING

CROSS-REFERENCE TO RELATED APPLICATIONS

This application is a continuation of International Application No. PCT/US05/010065, filed Mar. 24, 2005, which claims the benefit of U.S. Provisional Patent Application No. 60/556,207 entitled "Networked Wireless Camera and TV System for Personal AV Communications," invented by Muhammed Ibrahim Sezan on Mar. 24, 2004.

BACKGROUND OF THE INVENTION

Many households now contain personal digital input and recording devices typically for video, still image, audio and combinations thereof. These same households also contain computer monitors, televisions and other display devices. However there is currently no simple and convenient system by which these devices can communicate efficiently.

Many consumers would like to use personal digital input devices to record and display video, images and audio content. Current video cameras, still-image cameras and audio input devices have limited display/playback capabilities. A typical video camera or still-image camera has only a very small display that is insufficient to show a user any fine detail. Personal, portable audio devices also suffer from limited playback capabilities through small headsets.

Many televisions and other display devices can be connected to stationary playback devices (i.e., DVD players, VCRs) that allow the television or display to display images and/or video. However, these devices typically do not accept the media (i.e., Smartmedia Cards, Compact Flash Cards, mini digital video tapes, etc.) that personal digital input devices use for recording. A user typically has to go through a media conversion process before displaying or playing back on a stationary device with acceptable display or consumption capabilities.

Accordingly, a personal, portable input device that is wirelessly networked to a display/playback device would provide all the convenience of the personal portable device with expanded display/playback capabilities of a more stationary A/V display such as a digital television.

Current personal digital input devices are not specifically coupled or paired, through a wireless network, with a more stationary display/playback device. Typically, these devices must have full storage and limited display/playback capabilities onboard the personal, portable device so that it can be used as a stand-alone unit. This generally makes the pair of devices more expensive and tends to make the personal, portable device more cumbersome. It would be advantageous to have devices that are wirelessly networked and paired together so that the personal, portable device can "offload" some of its functionality to the more stationary device thereby making the portable device more portable and less expensive.

BRIEF SUMMARY OF THE INVENTION

Embodiments of the present invention comprise systems and methods for networking between audio-visual input devices (i.e., digital cameras, audio recorders, etc.) and display/playback apparatus such as digital televisions, displays and audio playback systems.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Embodiments of the present invention comprise systems and methods that enable convenient personal A/V communication using a personal, portable digital input device, such as a digital camera, video camera, audio recorder, another image capture device or similar device, which is wirelessly networked to a more stationary display/playback device, such as a television, computer display or audio playback system.

Figure 1:
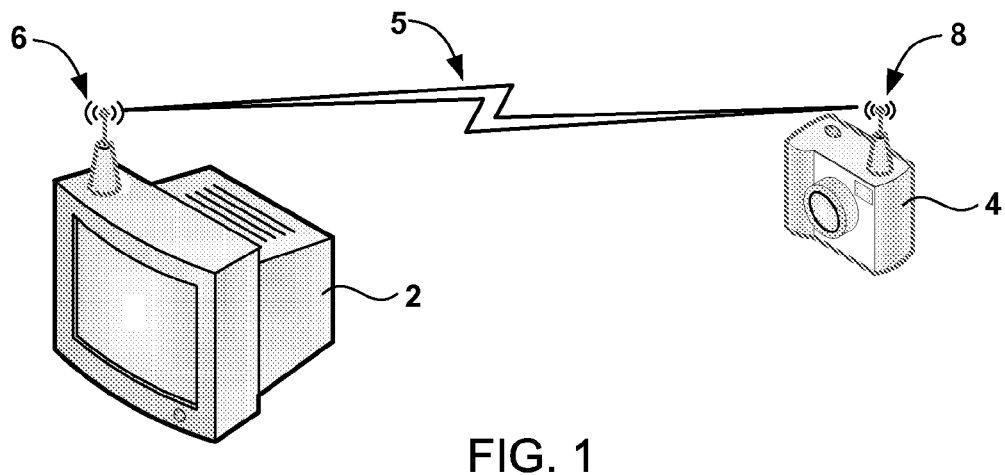
FIG. 1 is a diagram showing a linked wireless camera and display combination.

In some embodiments of the present invention, as illustrated in FIG. 1, a highly portable camera 4 may be wirelessly connected 5 to a television 2, such as a Liquid Crystal Display (LCD) television (LCTV). Some embodiments may comprise external antennas 6 & 8 or internal antennas (not shown). These embodiments may provide personal A/V communication comprising video telephony, video chat, video messaging, video e-mail and other capabilities. These and other functions may be provided anywhere within the range of the network, which may comprise entire households, offices or other areas. These embodiments may allow a user to conveniently share images and sounds of any person or object within the network range by including them in the contents of personal communication.

Figure 2:
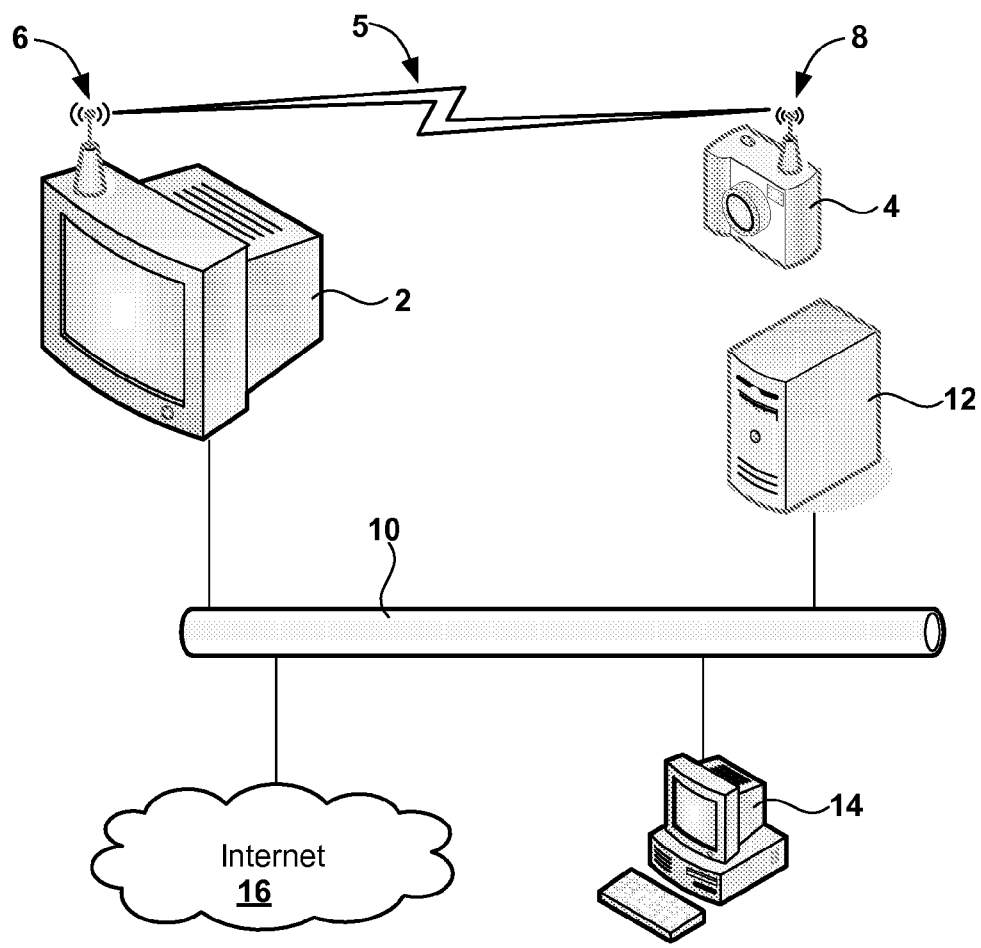
FIG. 2 is a diagram showing a linked wireless camera and display combination wherein the display is connected to other network devices.

Some embodiments of the present invention, illustrated in FIG. 2, comprise a wireless camera 4 and digital television 2 such as a Liquid Crystal Television (LCTV), which are networked over a digital wireless channel 5. The wireless network may comply with IEEE 802.11 a, b or g; or it may be a Bluetooth compliant network, a Wireless Metropolitan Area Network (WMAN), a 3G cellular network or some other wireless network. The TV 2 may also be Internet Protocol (IP) connected 10 to a Wide-Area Network (WAN) such as the Internet 16. The TV may be connected directly to the WAN or through a gateway in a way that enables personal A/V communication. The TV 2 may also be connected to other computing devices 12 & 14, such a personal computers and servers on a local area network (LAN) or on the WAN 16. The TV 2 may send and receive personal A/V content (e.g., real-time communication, A/V chat, A/V messaging, e-mail and other communications) over the network connection 10. Typically, the TV will be the primary display over which the received content from the camera 4 and the network 10 & 16 is viewed.

Figure 3:
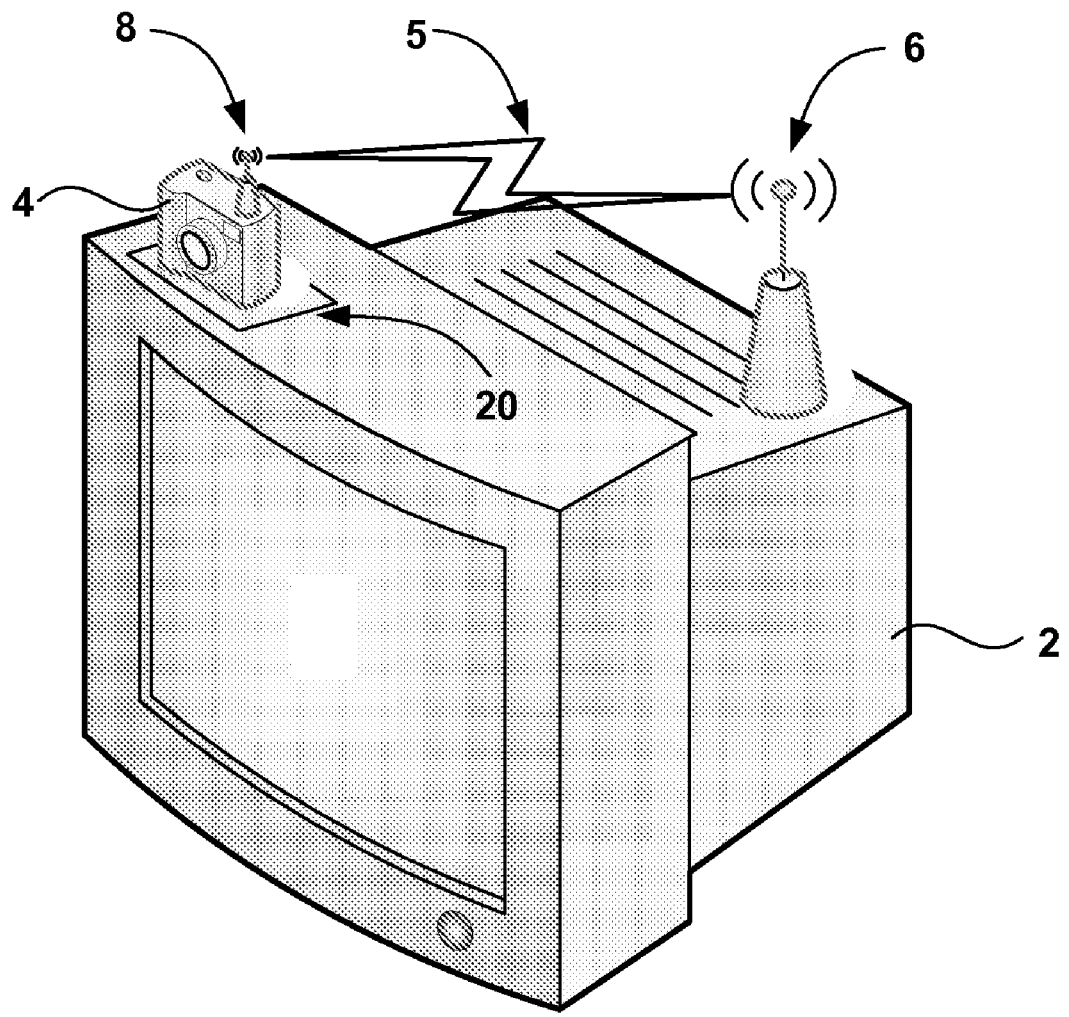
FIG. 3 is a diagram showing a wireless camera that is "docked" in a connected display device.

In some embodiments, illustrated in FIG. 3, a digital camera 4 may be used to capture a user's personal A/V communication content. The camera is wirelessly networked 5 to a display 2 that comprises a cradle, docking bay or other connector 20 adapted for the camera and which may comprise a charger for recharging camera batteries as well as a wired communication link.

Some known displays have an embedded camera unit that allows still image and video capture directly from the display, however these known devices do not allow capture of A/V content from a location remote to the display. For example, and not by way of limitation, with an embodiment of the present invention, a user may capture images of flowers in a yard with a highly portable camera that transmits the images to the display. The sound of birds in the yard can be simultaneously captured and transmitted in some embodiments. As another non-limiting example, a business group may use a wireless camera for a video conference. When the meeting is interrupted and forced to relocate, the camera may be picked up and transported to a new location without interrupting the video link and its complex configuration.

In some embodiments of the present invention, a wirelessly-linked camera may function in a plurality of modes depending upon the link between the camera and its linked display. In some of these embodiments, the linked display may comprise a "cradle," plug, socket or some other form of direct-contact physical connection that enables the camera to communicate with the display through a wired connection.

In other embodiments, a camera/display link may have a plurality of wireless modes. The camera/display link may switch between modes based on its device proximity, channel conditions or some other parameter. In an exemplary embodiment, a wirelessly-linked camera/display pair may use a direct wired connection when the camera is within a cradle on the display device, the pair may use a short-range wireless network, such as an IEEE 802.11 compliant network when the devices are within a home or building and the devices may switch to a long-range wireless connection such as a cellular phone network connection when they are miles apart.

When a camera/display link has multiple transmission modes, the device pair may switch between multiple encoding schemes that are tailored for each transmission mode. For example and not by way of limitation, when a camera is in a cradle connection on a display device, the encoding function in the camera may switch to a different scheme or the encoding function may be completely delegated to an encoder module in the display unit or in another network device. In this exemplary embodiment, a direct, wired connection is established in the cradle that disables the wireless link and enables a much higher bandwidth wired connection.

When a camera has established a directly-wired connection, a different source-channel encoding scheme may be selected to take advantage of increased bandwidth and increased power through the direct connection. The power consumption requirements and constraints on the in-camera A/V encoding and processing can also be relaxed in the directly-connected mode as the camera has a direct power connection as well when in the cradle connector.

Figure 4:
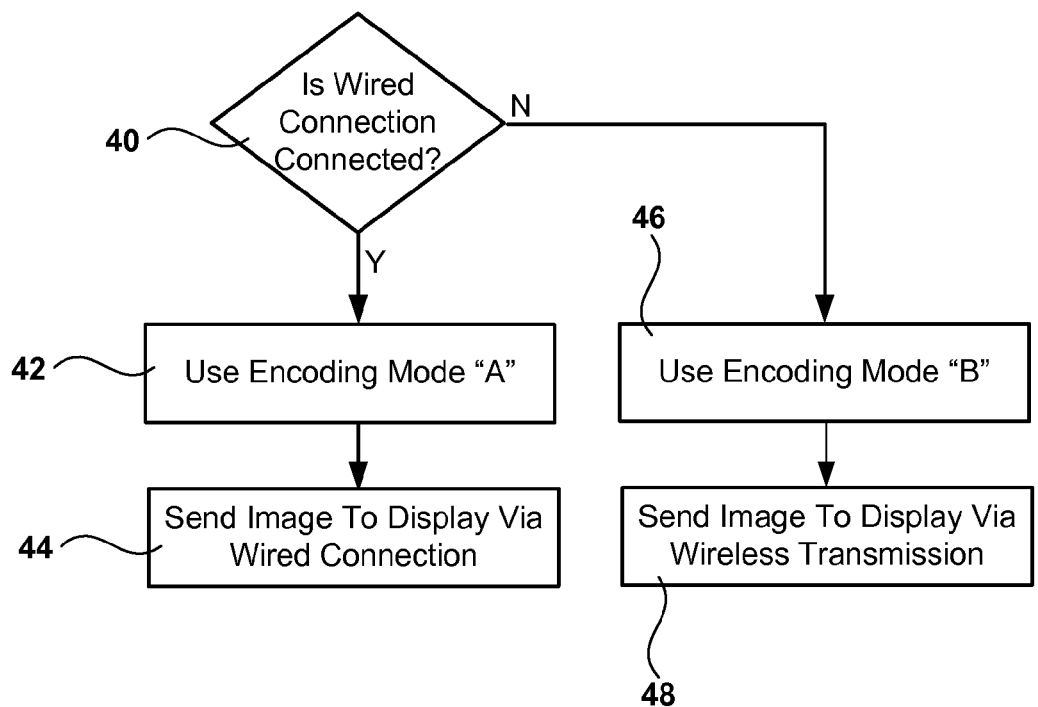
FIG. 4 is a chart showing steps of some embodiments with alternative encoding modes.

Some embodiments of the present invention may be described with reference to FIG. 4. In these embodiments, a connectivity manager that monitors the camera-to-display connection may detect 40 whether a wired or other form of high-bandwidth connection is presently connected. If the connection is available, a first encoding and/or transmission mode 42 will be used to encode and/or transmit the image data from the camera to the display. If the connection is available, the manager may also use 44 that connection for actual transmission of the image and other data. When the high-bandwidth connection is not connected, a second encoding or transmission mode is selected 46 and a lower-bandwidth connection 48, such as a wireless connection, is used for image and other data transmission.

Figure 5:
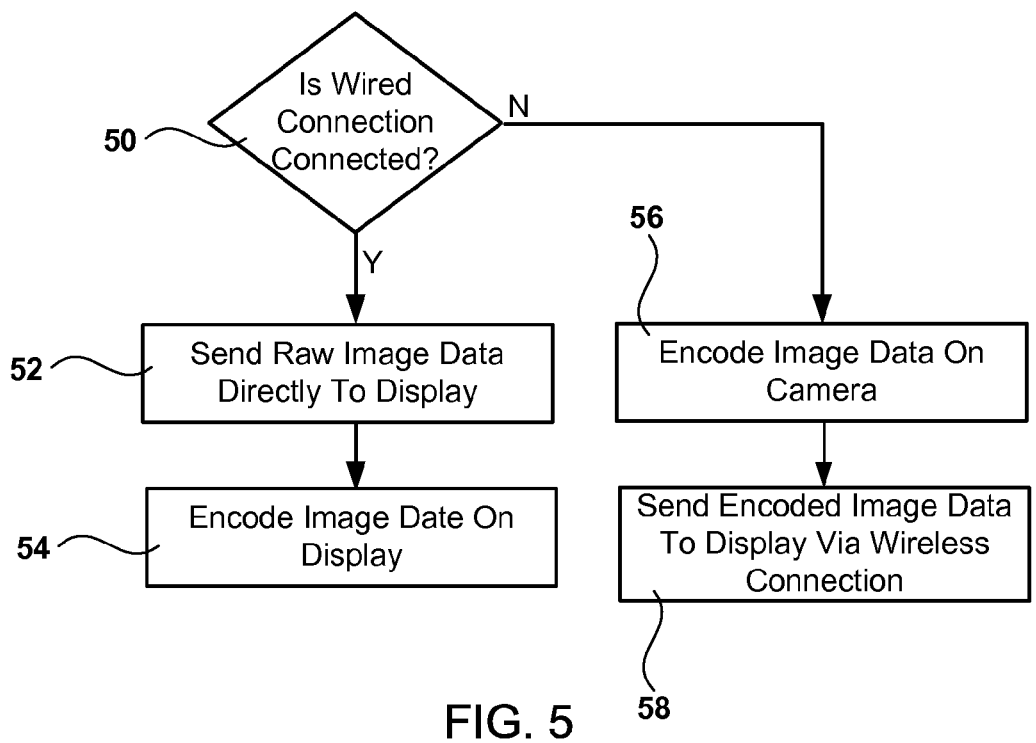
FIG. 5 is a chart showing steps of some embodiments with alternative encoding devices.

Other embodiments may be described with reference to FIG. 5. In these embodiments, a connectivity manager detects 50 whether a high-bandwidth connection, such as a wired connection, is connected. If the connection is connected, image data may be sent 52 directly from the camera to the display device or image processing device without encoding on the camera. The image data may then be encoded 54 on the display or processing device. When the connection is not available, image data may be encoded 56 on the camera and the encoded data may be sent 58 over a wireless or other lower-bandwidth connection.

Figure 6:
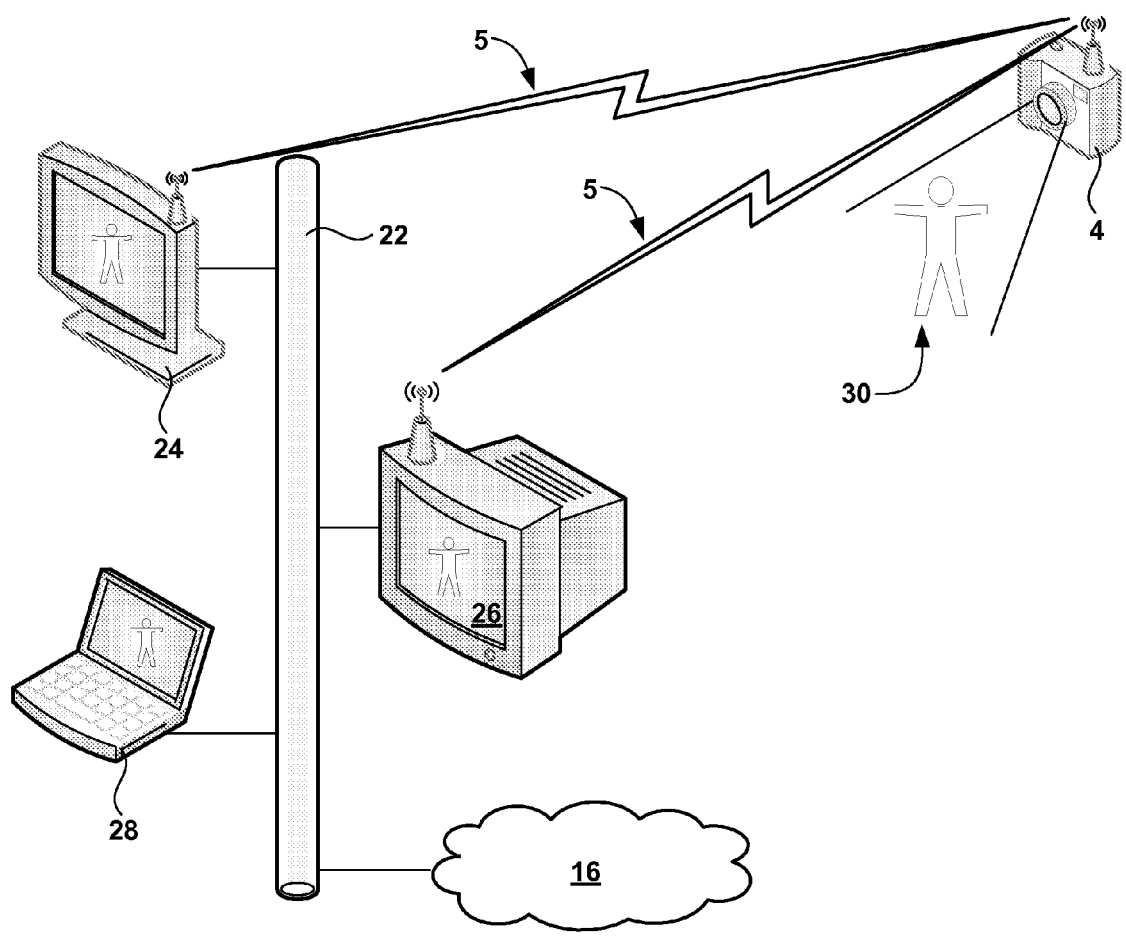
FIG. 6 is a diagram showing a wireless camera and display combination wherein the display is connected through a network to supplemental display devices.

In some embodiments of the present invention, illustrated in FIG. 6, a wirelessly networked camera 4 may be linked to a series of display devices 24, 26 & 28 on a network 22, such as a home network with multiple LC TVs. In these embodiments, the camera 4 may transmit data 5 to one or more of the networked displays, from which the data may be transmitted to other recipients. In the exemplary embodiment illustrated in FIG. 6, the camera 4 transmits an image 32 of a subject 30 over a wireless connection to display device 26. Display device 26, then transmits the image 32 over a network 22 to other display devices 24 & 28 or other recipients on a WAN 16. The particular network used may be an IEEE 802.11 compliant network, some other wireless network system, a wired network or a network using some other medium. In some of these embodiments, the camera can act as a relay or source on the display network.

Figure 7:
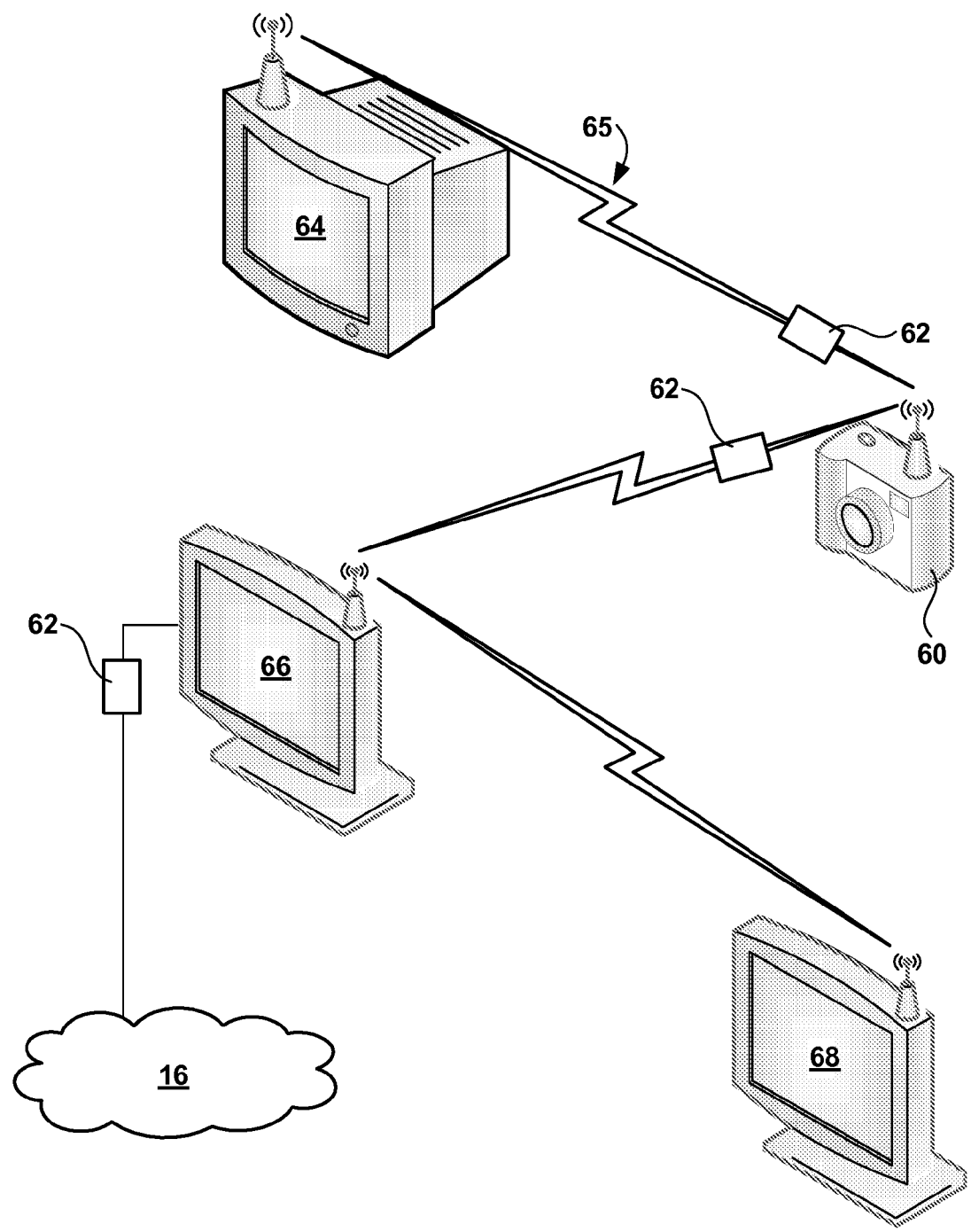
FIG. 7 is a diagram showing a wireless camera that may act as a relay between wirelessly connected display devices.

In further networked embodiments of the present invention, illustrated in FIG. 7, a camera or other input device 60 may act as a relay and/or source in the network. In these embodiments, an input device 60 may capture an image, sound bite or other data 62 and transmit 65 the captured content to multiple display devices 64, 66 & 68 as well as other recipients on a WAN 16 that may be connected through a display 68. In these embodiments, the input device 60 may act as a relay joining the displays 64, 66 & 68 and transmitting data between them.

In some embodiments of the present invention, a personal digital input device, such as a digital camera is paired with a display device such as a LC TV. Of course, many other devices can also be used. In these embodiments, some of the functions traditionally incorporated into the camera or other portable input device can be "off-loaded" to the LC TV or other stationary or semi-stationary display/playback device. In an exemplary embodiment, a highly portable camera, comprising video and/or still image capture functions, contains an encoder unit for encoding image data, however, this highly portable device does not have a decoder. The decoder unit for this pair of devices resides only in the display device thereby lowering the resource requirement for the portable camera.

In some of these embodiments, other functions and their supporting hardware may be off-loaded to the more stationary device. In another exemplary embodiment, the portable camera's major storage capability is off-loaded to the display. In some of these embodiments, the tape recording unit of a video camera is off-loaded to the display, making the camera much lighter and less expensive. In a similar manner, the digital storage card typically used in a still image camera may be off-loaded or partially off-loaded. In this case, the weight and size of the device are not drastically affected, however the expensive cards are eliminated as the camera streams or otherwise transmits its captured content directly to a networked display with much greater storage capacity and storage diversity.

In still other embodiments, on-camera displays may be replaced with simple view-finders to make extremely lightweight, small and economical devices. Camera configuration interfaces may also be off-loaded to the display device.

In further embodiments of the present invention, a portable camera that is wirelessly linked to a semi-stationary display device may be constructed without frame memory for storing image or video data. This memory off-loading can further reduce camera cost and increase portability and ease of use. In some of these memory-lean embodiments, the camera unit may have an on-board LCD display for displaying captured content and an on-board speaker for playback of captured audio.

In still further embodiments of the present invention, a wireless camera unit that is wirelessly linked to a display may comprise network bandwidth estimation and adaptation modules for robust A/V streaming to the display. In some embodiments, the camera or display may adapt the sending rate according to varying wireless channel conditions.

In these embodiments, the wireless channel condition variations may be due to the distance between the mobile camera and the linked display. The condition variations may also be due to interference and competing traffic or due to the characteristics of a particular location.

Some embodiments of the present invention comprise a wirelessly-linked camera and display that use non-symmetrical encoding and decoding. In these embodiments, the camera comprises encoding functions, but no decoding functions and the display comprises decoding functions. The coding/encoding are non-symmetrical because the camera encoder is very-low in complexity and the encoder in the display has high complexity. Some embodiments comprise video coding algorithms that are based on the principles of Wyner-Ziv theory. Non-symmetrical codecs work well in this application because they can provide a low cost camera with low power consumption.

Some embodiments of the present invention comprise a smart-networked-wireless camera that is adaptive to the communication functionality selected by a user. In some embodiments, a user may select a communication function or content capture mode such as real-time conversation, A/V messaging, static e-mail, video capture, still image capture, audio capture or some other function. In the case of real-time conversation with A/V content, a camera may use methods to optimize the routing of the A/V signal over the network in order to reduce congestion and to reduce distortion. The cameras of these embodiments may use different source-channel encoding strategies depending on the communication functionality selected by the user.

Figure 8:
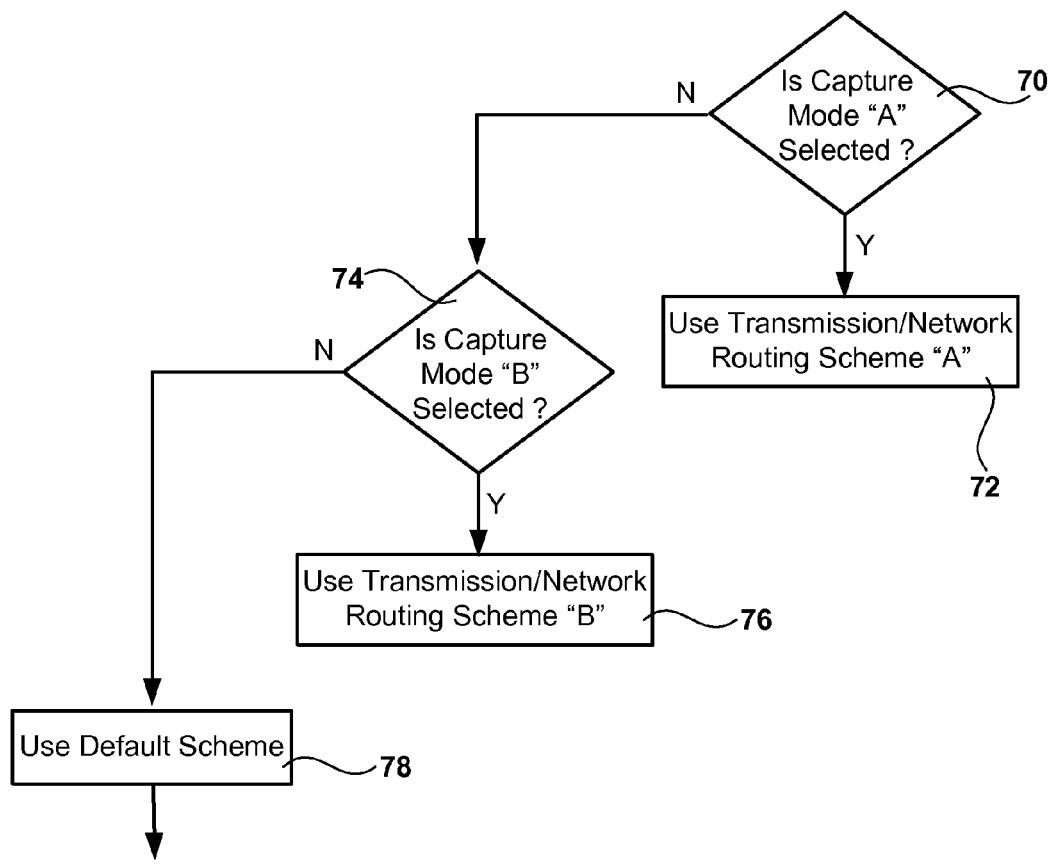
FIG. 8 is a chart showing steps of embodiments comprising alternative transmission/network routing schemes.

In some exemplary embodiments, illustrated in FIG. 8, an encoding and/or transmission scheme is selected depending on the communication function or capture mode selected by a user. In these embodiments, a detector detects what capture mode/communication function is selected. If a specific mode/function is selected, Mode "A," 70 a corresponding encoding, transmission, network routing scheme is used 72. If another mode/function, Mode "B," is selected, another encoding, transmission or network routing scheme is used 76. When further modes or function are available, still further encoding, transmission and network routing schemes may be employed. In some embodiments, a default scheme 78 may be used, when specific modes or functions are not selected.

Figure 9:
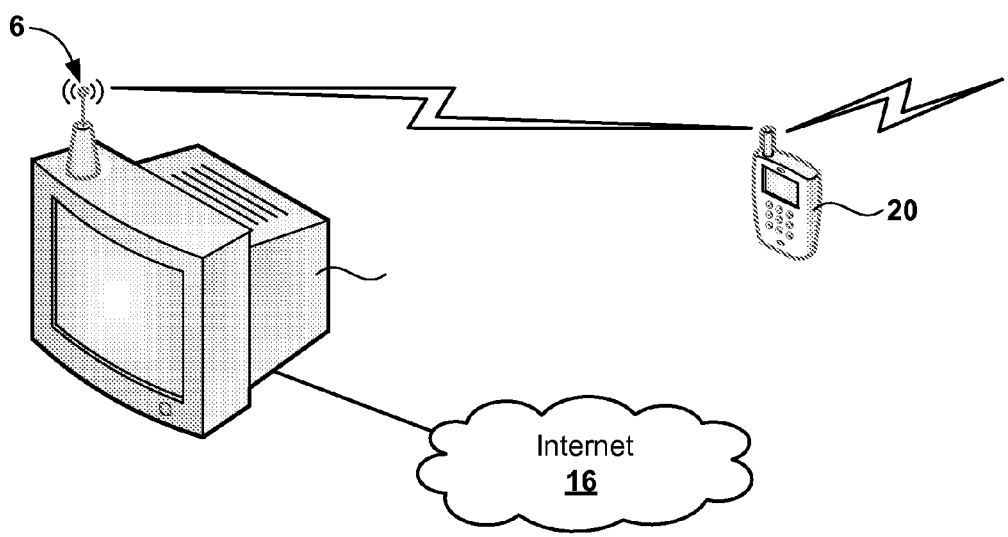
FIG. 9 is a diagram showing a wireless camera and cellular phone combination device that is wirelessly linked to a display.

In additional embodiments of the present invention, illustrated in FIG. 9, the wirelessly-linked capture device (i.e., camera, microphone) 20 may be combined with a cellular phone or other device with long-range communication capabilities. In these embodiments, the image captured by the camera 20 may be transmitted to one or more remote locations wirelessly.

In some embodiments of the present invention, A/V and/or still image content that has been recorded on the display or a device networked with the display can be played back or reviewed on the display before it is transmitted to other recipients. Some embodiments comprise hardware and/or software applications for content playback, editing and review.

Figure 10:
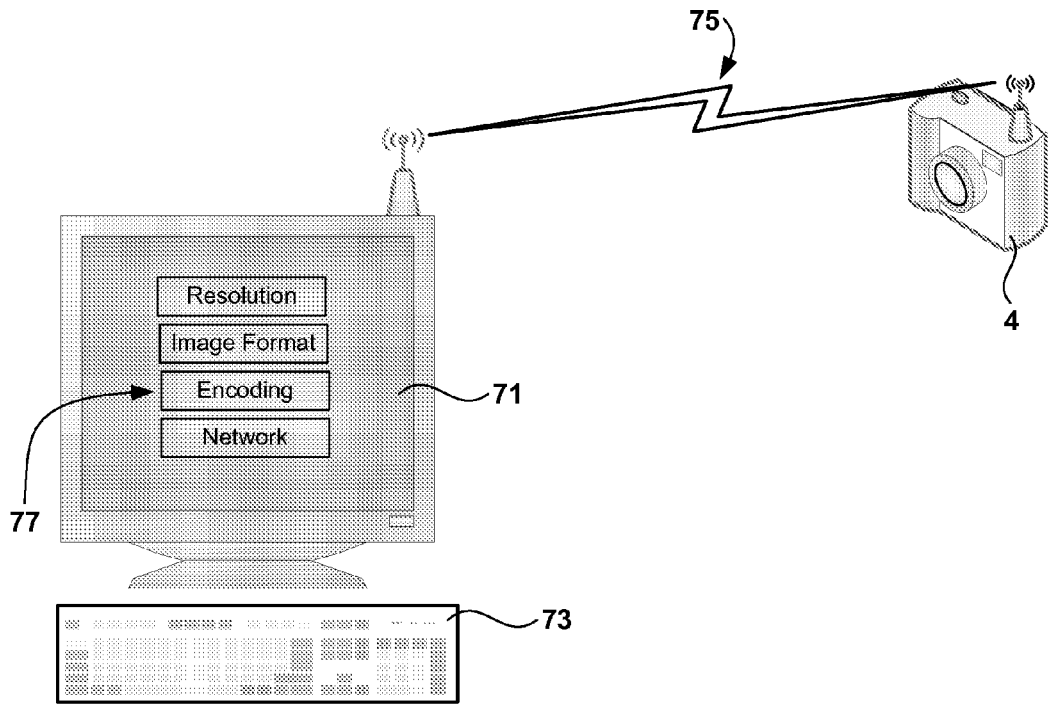
FIG. 10 is a diagram showing a wireless camera and display combination wherein camera configuration is performed on the display device.

Still other embodiments of the present invention comprise a networked wireless camera that can be configured through a display, as illustrated in FIG. 10. In some of these embodiments, a user interface 77 on the display 71 or connected thereto can be used to select camera configuration functions and configure the camera 4 over the wireless network link 75. Some of these embodiments comprise a camera 4 with no independent configuration capability and no user interface. These embodiments further reduce the cost and complexity of the portable camera 4. In some embodiments, the IP network configuration of the camera 4 may be performed on the linked display 71.

In some embodiments of the present invention, camera and input device modes can be interactively selected and configured by a user using an on-screen menu interface 77 displayed on the linked display 71. Communication modes as well as camera functions can be selected and configured from the linked display 71. Still image, video, and audio modes can be selected. Real-time video, video messaging, video storage and other functions can be selected as well. Some embodiments can be used for monitoring rooms and for video intercom applications.

Figure 11:
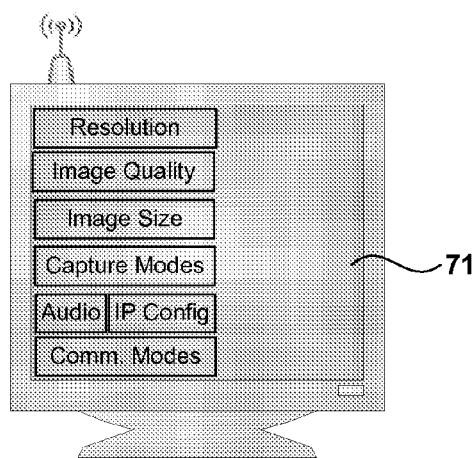
FIG. 11 is a diagram showing various configuration options for the camera/display combination of FIG. 10.

Some of these embodiments, illustrated in FIG. 11, provide for configuration of capture device (i.e., camera, microphone) capture modes, resolutions, image quality, image size, audio characteristics, IP configuration, communication modes and other options.

Some embodiments of the present invention may comprise a camera with an "ID" function. In these embodiments, a camera may roam between networked displays and identify and configure itself for use with various devices within its network range. For example, a camera may identify itself to the closest display device and begin transmitting its content to that display when it is within a certain proximity range.

Figure 12A:
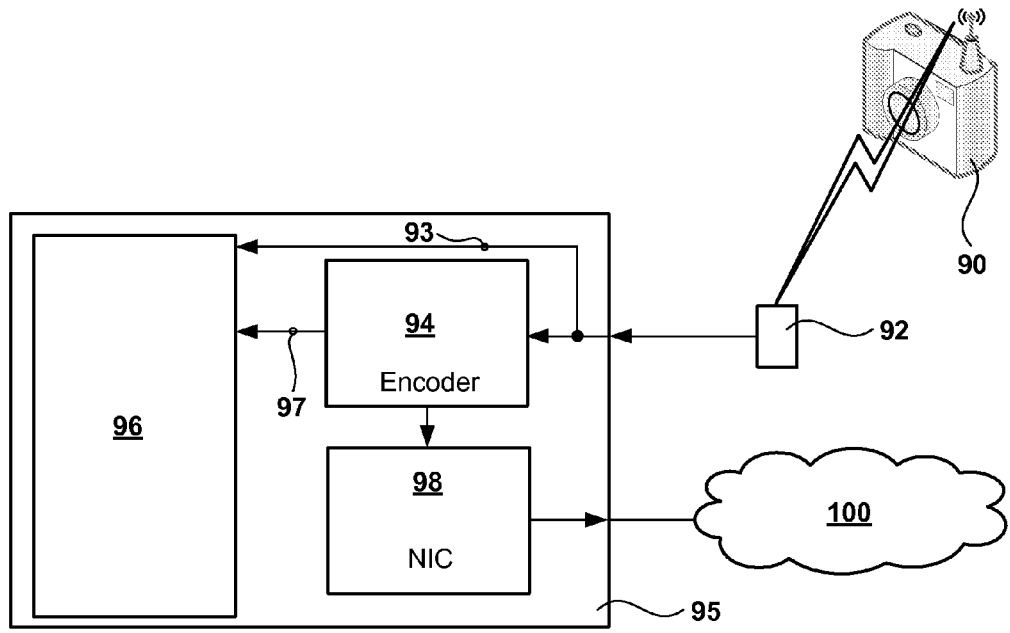
FIG. 12(A) is a diagram showing embodiments comprising a camera/capture device with no encoder.

The structure of system encoders, decoders and transcoders may vary widely in various embodiments of the present invention. In some embodiments, illustrated in FIGS. 12A-12D the codec components may be moved from camera to display. In the embodiments shown in FIG. 12A, a camera 90 captures raw image data and transmits the unencoded image data 92 to a display device 95 comprising an encoder 94, which encodes the captured image data in a format that can be used downstream on a network 100. Typically, a network interface 98 will be used to connect to a network, such as the Internet, and allow transmission of the encoded image data to network recipients. The display device will generally also comprise a display screen 96 for display of image data that is received before encoding 93 or decoded after encoding 97.

Figure 12B:
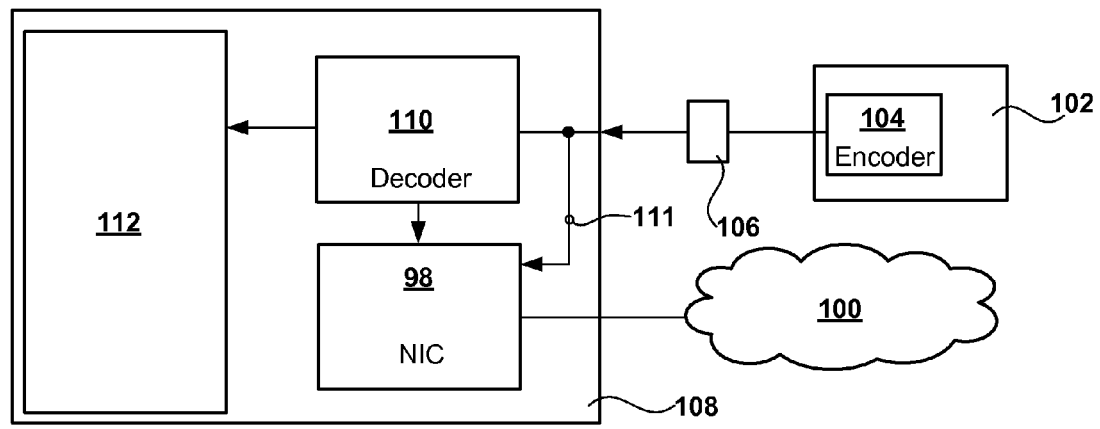
FIG. 12(B) is a diagram showing embodiments comprising a camera/capture device with an onboard encoder.

Some embodiments, illustrated in FIG. 12B, comprise a camera 102 with an encoder 104 on-board. In these embodiments, encoded image data 106 is sent from the camera/capture device 102 to the display device 108 where a decoder 110 decodes the image data for display on a display screen 112. The decoded image data may also be sent to a network interface 98 for transmission to other network devices on a network 1 00. Alternatively, the encoded image data may be transmitted 111 to the network without decoding.

Figure 12C:
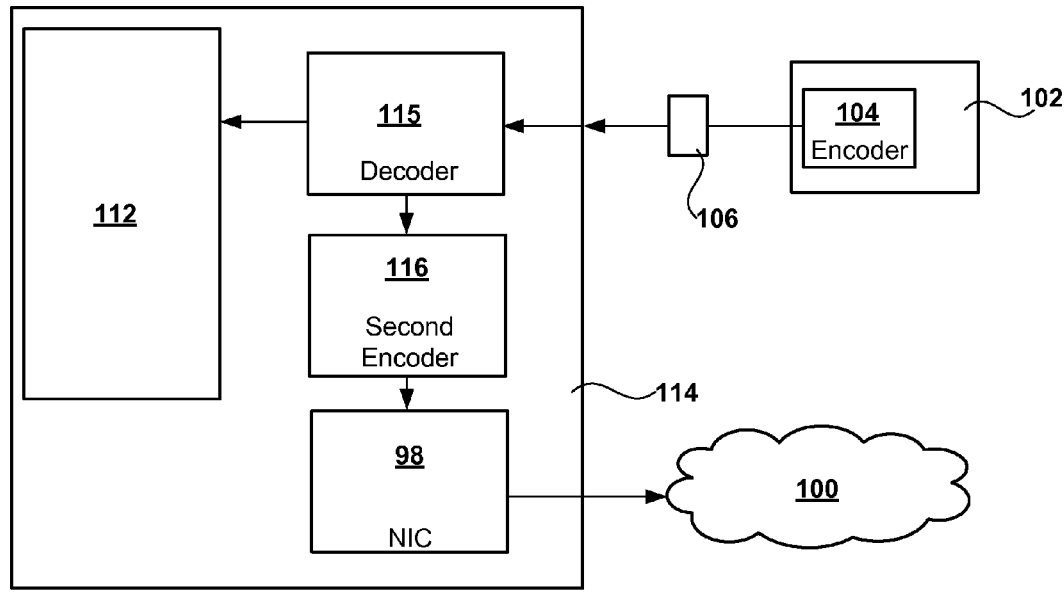
FIG. 12(C) is a diagram showing embodiments comprising a wirelessly-linked display device with a second encoder.

In other embodiments, illustrated in FIG. 12C, a camera/capture device 102 comprises an encoder 104 for encoding image data. The encoded image data 106 is sent to a display device 114 comprising a decoder 115, a display 112, a second encoder 116 and a network interface 98. The incoming encoded image data is decoded by the decoder 115 and sent to the display screen 112 for display. The decoded data is also sent to the second encoder 116 for encoding in a format suitable for network transmission. This encoded data is then sent to a network interface 98 for routing to the network 100.

Figure 12D:
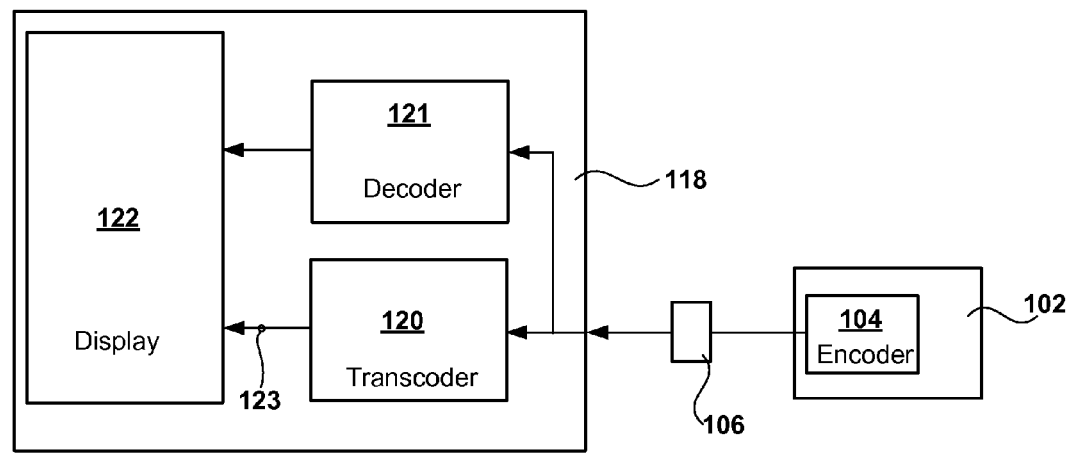
FIG. 12(D) is a diagram showing embodiments comprising a wirelessly-linked display device with a transcoder.

In still other embodiments, illustrated in FIG. 12D, a camera/capture device 102 comprises an encoder 104 for encoding image data 106 to be sent to a connected display device 118. The display device 118 comprises a transcoder 120 for decoding and re-encoding the image data into another image format. In some embodiments, this may be an image format more suitable for network transmission. These embodiments may further comprise a display 122 that may receive image data from a decoder 121 or directly 123 from transcoder 120 when a suitable format is used.

Figure 13:
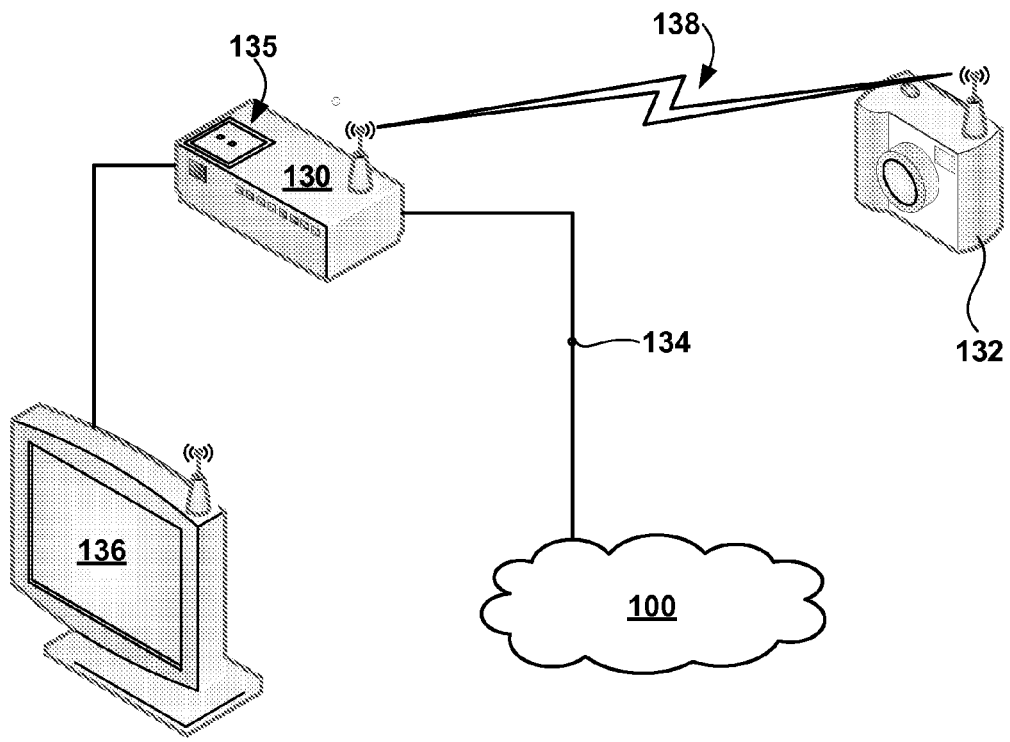
FIG. 13 is a diagram showing embodiments comprising a wirelessly-linked image processing device with a display device connected directly to the processing device.

Further embodiments of the present invention, illustrated in FIG. 13, comprise a separate image processing device 130 for receiving a wireless signal 138 from a portable audio/video capture device 132. Image processing device 130 may take the form of a set top box (STB) or similar device that is connected 134 to a display device 136 either directly with a wired connection or with a wireless connection. The display device may also be connected to a network 100 thereby allowing the signal from the STB 130 to be routed to network devices. Some embodiments may also comprise a cradle, docking station or other connector 135 for a direct wired connection between the STB 130 and camera 132. This direct wired connection may comprise a data connection as well as power and other connections.

Figure 14:
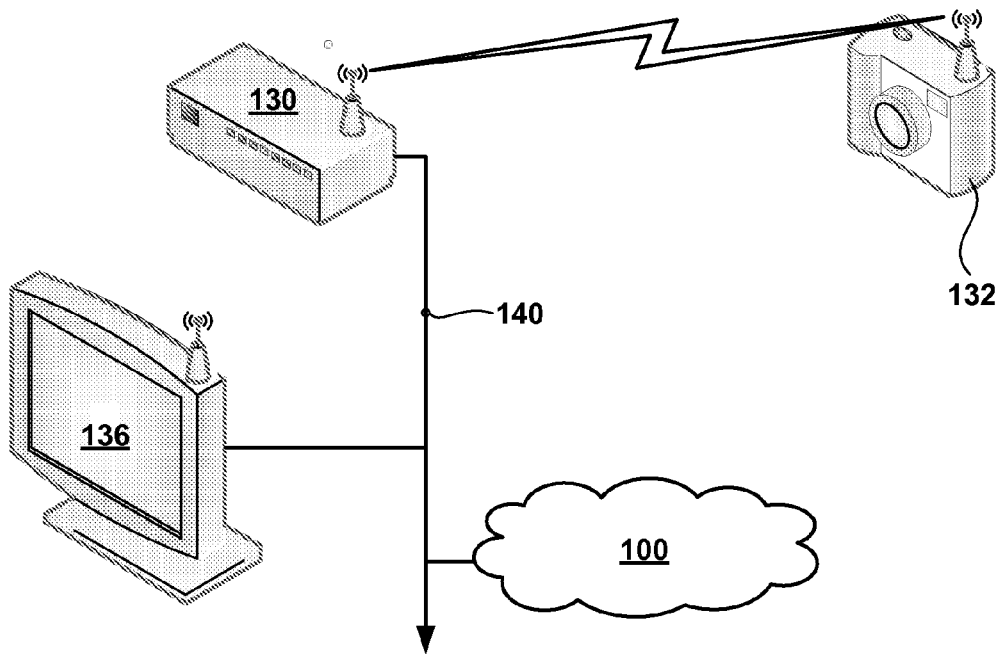
FIG. 14 is a diagram showing embodiments comprising a wirelessly-linked image processing device with a display device connected to the processing device through a network connection.

Still other embodiments, illustrated in FIG. 14, comprise a portable, wireless audio/video capture device 132, a separate image processing device 130, a display device 136 and network connection 140. In these embodiments, A/V content may be captured on the capture device 132 and transmitted wirelessly to the processing device 130, which is connected to display 136 via a network connection 140. Many variations of these separate image processing device embodiments may be realized by applying the methods described for the display embodiments described above.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for capturing image data, said system comprising:
   a) a portable image capture device comprising:
      i) an imaging sensor,
      ii) an encoder,
      iii) a short-range wireless transmitter;
      iv) a long-range wireless transmitter; and
      v) an identification (ID) function;
   b) a plurality of stationary image display devices, each of said stationary image display devices comprising:
      i) a display,
      ii) a decoder,
      iii) a short-range wireless receiver;
      iv) a network interface; and
      v) a long-range wireless receiver;
   c) wherein images captured on said image capture device may be transmitted to said image display devices and routed to a network location through said network interface;
   d) wherein said portable image capture device transmits images to said stationary image display devices over a short-range wireless network when said portable image capture device is within a specified range of said stationary image display devices;
   e) wherein said portable image capture device transmits images to said stationary image display devices over a long-range wireless network when said portable image capture device leaves said specified range of said stationary image display devices;
   f) wherein said portable image capture device roams between said plurality of stationary image display devices by identifying itself using said ID function and configuring itself to transmit images to said stationary image display devices within range of said long-range wireless network and said short-range wireless network; and
   g) wherein said portable image capture device selects a first encoding scheme for use with said short-range wireless network and said portable image capture device selects a second encoding scheme for use with said long-range wireless network.

2. A system as described in claim 1 wherein said long-range wireless transmitter is a wireless telephony transceiver.

3. A system as described in claim 1 wherein said long-range wireless transmitter is a cell phone.

4. A system as described in claim 1 wherein said image display devices further comprises an image display function for displaying images captured with said image capture device.

5. A system as described in claim 1 wherein said image display devices further comprises an image editing function for editing images captured with said image capture device.

6. A system as described in claim 1 wherein said image display devices further comprises a portable image capture device configuration function whereby said portable image capture device may be configured via input on said image display device.

7. A system as described in claim 1 wherein said image display devices further comprises a portable image capture device configuration function whereby the IP network configuration of said portable image capture device may be configured via input on said image display device.

8. A system as described in claim 1 wherein said image display devices further comprises a portable image capture device configuration function whereby the image capture configuration of said portable image capture device may be configured via input on said image display device.

* * * * *